(12) United States Patent
Fryer et al.

(10) Patent No.: US 10,836,577 B2
(45) Date of Patent: Nov. 17, 2020

(54) ROBOTIC SERVICE DEVICE AND HANDLING METHOD

(71) Applicant: OCADO INNOVATION LIMITED, Hatfield, Hertfordshire (GB)

(72) Inventors: Mark Fryer, Hatfield (GB); Andy Ingram-Tedd, Hatfield (GB); Siddique Shaikh, Hatfield (GB); Sverker Lindbo, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 66 days.

(21) Appl. No.: 15/127,308

(22) PCT Filed: Mar. 18, 2015

(86) PCT No.: PCT/EP2015/055695
§ 371 (c)(1),
(2) Date: Sep. 19, 2016

(87) PCT Pub. No.: WO2015/140216
PCT Pub. Date: Sep. 24, 2015

(65) Prior Publication Data
US 2018/0194571 A1    Jul. 12, 2018

(30) Foreign Application Priority Data

Mar. 18, 2014    (GB) .................... 1404870.6

(51) Int. Cl.
*B65G 1/04*    (2006.01)
*B66F 9/075*    (2006.01)
*B65G 45/10*    (2006.01)

(52) U.S. Cl.
CPC ............. *B65G 1/0464* (2013.01); *B65G 1/04* (2013.01); *B65G 1/0478* (2013.01); *B65G 45/10* (2013.01); *B66F 9/07504* (2013.01)

(58) Field of Classification Search
CPC ...... B65G 1/04; B65G 1/0407; B65G 1/0421; B65G 1/0464; B65G 1/0478; B65G 1/0492; B66F 9/07504
See application file for complete search history.

(56) References Cited

U.S. PATENT DOCUMENTS 2,701,065 A    2/1955    Bertel
3,661,280 A *  5/1972    Atwater ............... B65G 1/0407
                                                      187/348

(Continued)

FOREIGN PATENT DOCUMENTS

EP    0 767 113 A2    4/1997
EP    1 037 828       9/2000

(Continued)

OTHER PUBLICATIONS

International Search Report (PCT/ISA/210) dated Jun. 17, 2015, by the European Patent Office as the International Searching Authority for International Application No. PCT/EP2015/055695.

(Continued)

*Primary Examiner* — James Keenan
(74) *Attorney, Agent, or Firm* — Buchanan Ingersoll & Rooney PC

(57) ABSTRACT

A robotic service device is described for use on a robotic picking system grid. The robotic service device is capable of driving to any location on the grid order to perform maintenance operations or cleaning. Additionally, the service device may be used to rescue robotic load handling devices operational in the picking system. The robotic service device may include a releasable docking mechanism to enable it to dock and latch on to malfunctioning load handling devices. The service device may also be provided with cleaning capability and a camera to enable the condition of the grid and other robotic devices to be monitored.

18 Claims, 16 Drawing Sheets

(56) References Cited

U.S. PATENT DOCUMENTS

| | | | | |
|---|---|---|---|---|
| 6,042,321 A | * | 3/2000 | Labell | B65G 1/0414 |
| | | | | 414/276 |
| 6,654,662 B1 | | 11/2003 | Hognaland | |
| 6,885,911 B1 | * | 4/2005 | Smith | G11B 15/6835 |
| | | | | 104/88.02 |
| 10,654,661 B2 | * | 5/2020 | Hognaland | B08B 1/00 |
| 2012/0152877 A1 | * | 6/2012 | Tadayon | B25J 5/02 |
| | | | | 212/224 |
| 2012/0259482 A1 | | 10/2012 | Jeschke | |
| 2015/0127143 A1 | | 5/2015 | Lindbo et al. | |
| 2017/0131720 A1 | * | 5/2017 | Sullivan | B65G 1/0492 |

FOREIGN PATENT DOCUMENTS

| | | | |
|---|---|---|---|
| EP | 2 020 388 A1 | | 2/2009 |
| NO | 317366 B1 | | 1/2001 |
| WO | WO 98/49075 A1 | | 11/1998 |
| WO | WO-2008/061951 A1 | * 5/2008 | B65G 1/04 |
| WO | WO 2013/167907 A1 | | 11/2013 |

OTHER PUBLICATIONS

Written Opinion (PCT/ISA/237) dated Jun. 17, 2015, by the European Patent Office as the International Searching Authority for International Application No. PCT/EP2015/055695.

\* cited by examiner

PRIOR ART

PRIOR ART

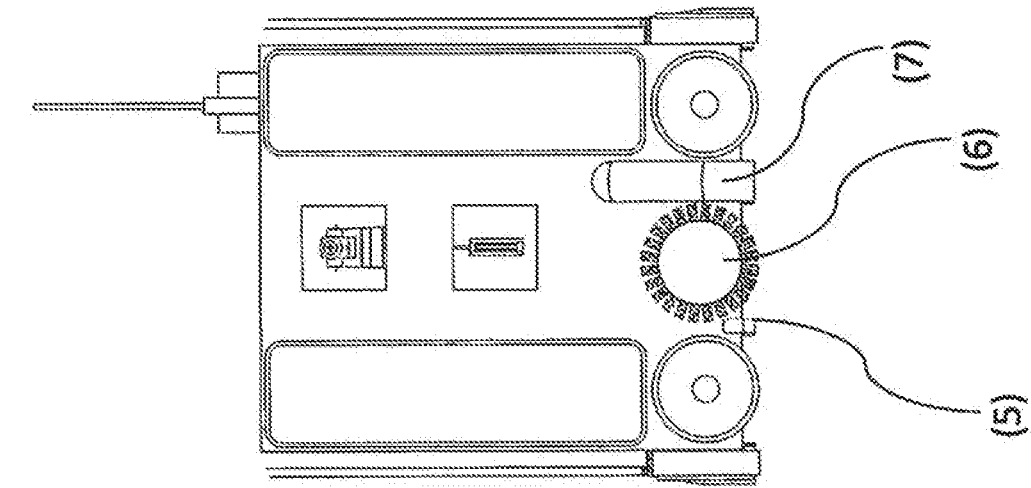
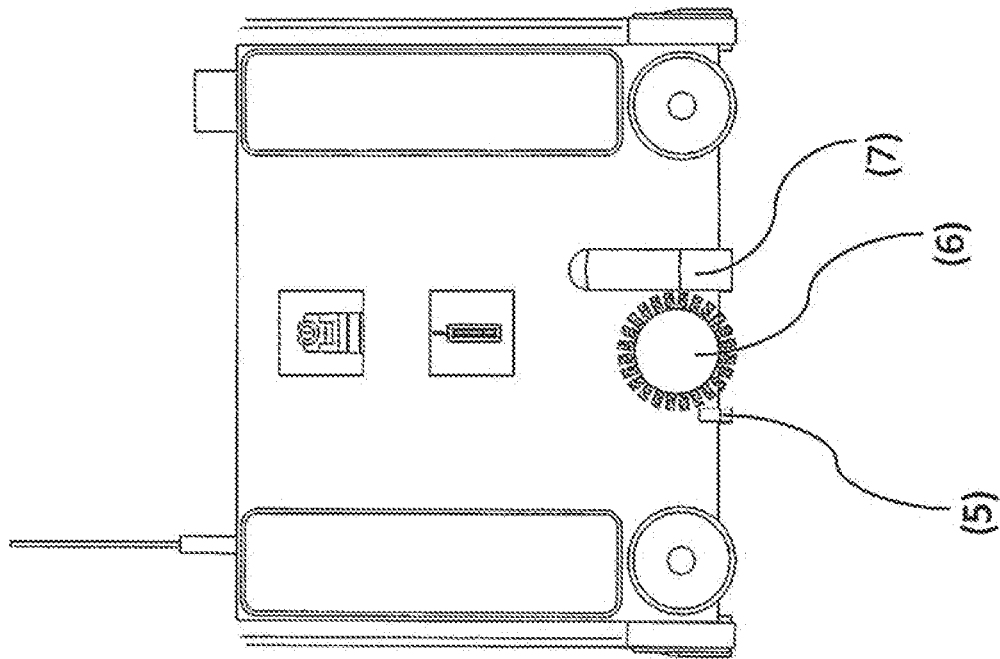
Figure 7

ROBOTIC SERVICE DEVICE AND HANDLING METHOD

FIELD OF THE INVENTION

The present invention relates to a robotic picking system device and method. More specifically but not exclusively, it relates to a robotic service device for use in a robotic picking system and a method of improving the reliability of such systems.

CROSS REFERENCE TO RELATED APPLICATIONS

This application claims priority from UK Patent Application no. GB1404870.6 filed on 18 Mar. 2014 the contents of which is hereby incorporated by reference.

BACKGROUND OF THE INVENTION

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No 1314313.6 where each robotic load handler only covers one grid space, thus allowing higher density of load handlers and thus higher throughput of a given size system.

In some implementations of such bin handling systems, there can be a very large number of robotic load handling devices running on a single grid. These load handling devices can experience problems from time to time and require repair or other intervention in order to return to useful service. Furthermore, there may be spillages or a build-up of dirt or dust on the grid which will require cleaning.

It is a disadvantage of the prior art systems described above that in order to rescue a faulty load handling device or in order to clean the grid, a user is required to access the grid on the stack and perform the necessary operations manually to fix or remove the load handling device or to clean the grid.

For these operations to happen safely it is necessary to stop all robotic load handlers on the grid before the user is allowed access. The higher the number of robotic load handlers in use and the larger the grid, the higher the likelihood of faults occurring and an increased consequence of each fault, due to the number of units which have to be stopped.

SUMMARY

According to the invention there is provided a service device for operation on a robotic picking system comprising two substantially perpendicular sets of rails forming a grid and having robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with a releasable latching mechanism, the latching mechanism being operable to releasably dock the service device to any load handling device present on the grid, the latching mechanism additionally being operable to isolate the load handling device from the grid such that the service device assumes control of the load handling device and moves the load handling device to a predetermined position on the grid under the control of the picking system.

According to the invention there is further provided a service device for operation on a robotic picking system comprising two substantially perpendicular sets of rails forming a grid and having robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with a cleaning mechanism comprising means for removing contaminants present on the grid system.

In this way, the present invention overcomes the problems of the prior art and provides a system and method of increasing the reliability and reducing the overall cost of large bin handling systems by the deployment of one or more automated service robots.

The invention will now be described with reference to the accompanying diagrammatic drawings in which

BRIEF DESCRIPTION OF THE DRAWINGS

FIGS. 7a and 7b are schematic side views of the robotic service device of FIGS. 5 and 6 showing the wheels, drive system and a cleaning mechanism;

DETAILED DESCRIPTION

Figure 1:
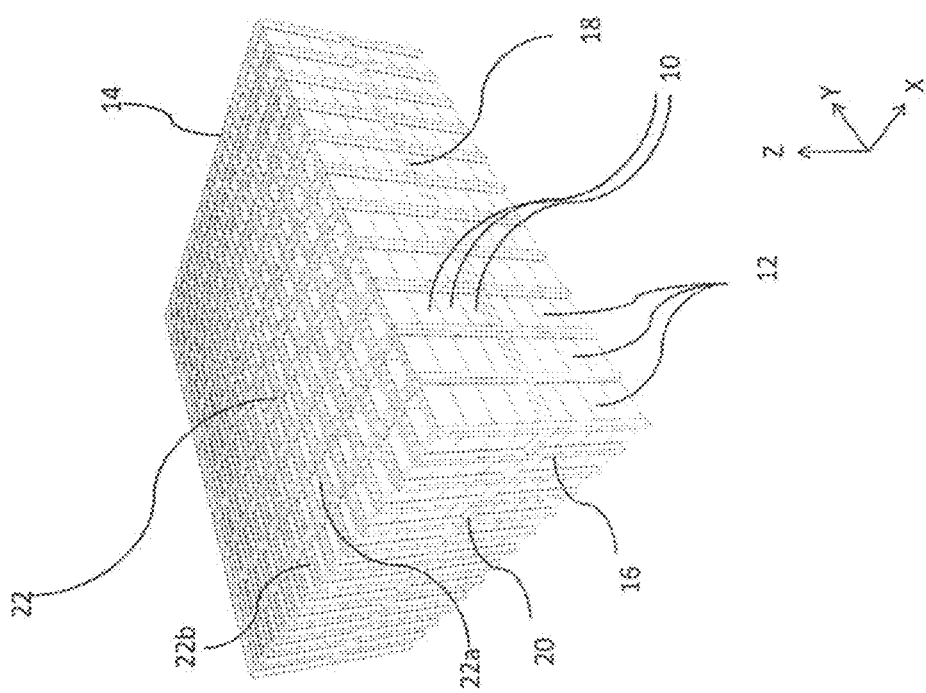
FIG. 1 is a schematic perspective view of a frame structure for housing a plurality of stacks of bins in a known storage system.
Figure 2:
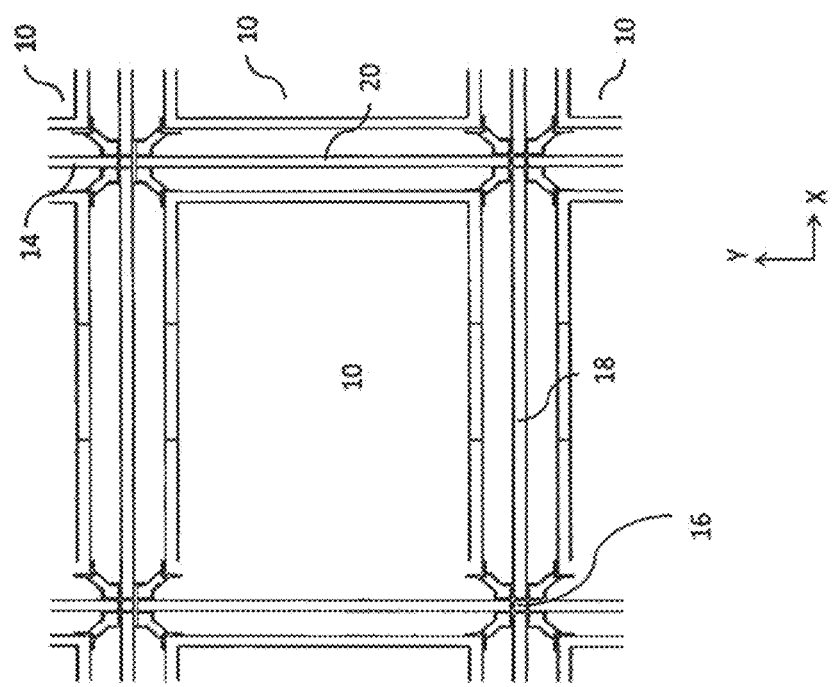
FIG. 2 is a schematic plan view of part of the frame structure of FIG. 1.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3:
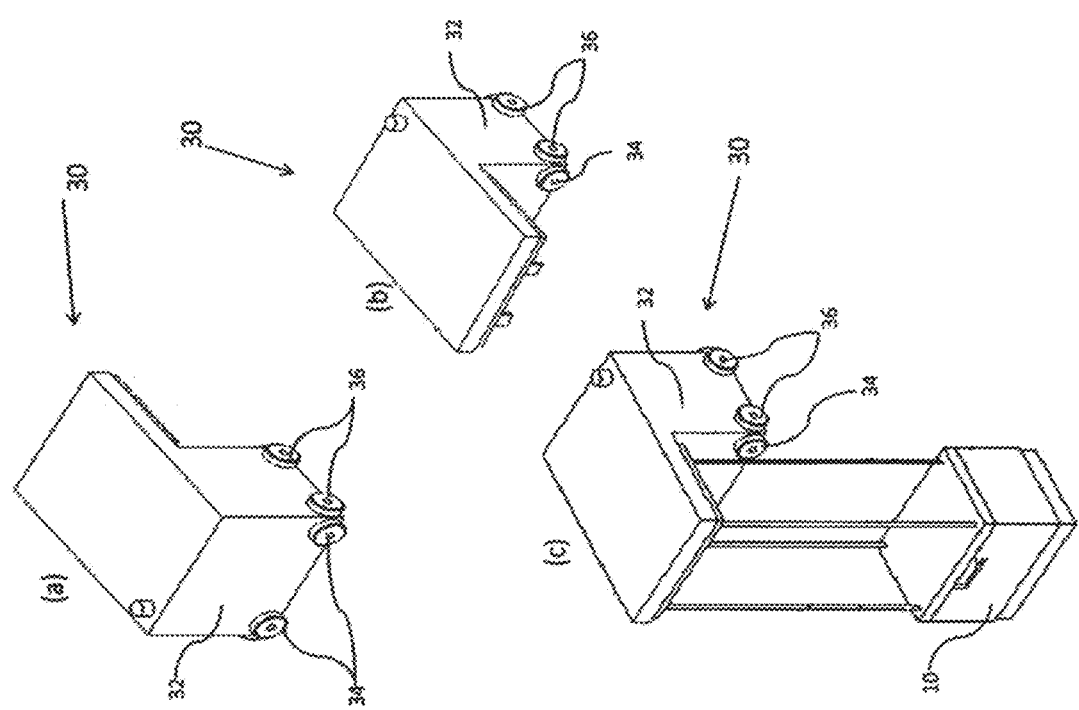
FIGS. 3(a) and 3(b) are schematic perspective views, from the rear and front respectively, of one form of robotic load handling device for use with the frame structure of FIGS. 1 and 2.
FIG. 3(c) is a schematic perspective view of the known load handler device in use lifting a bin.
Figure 4:
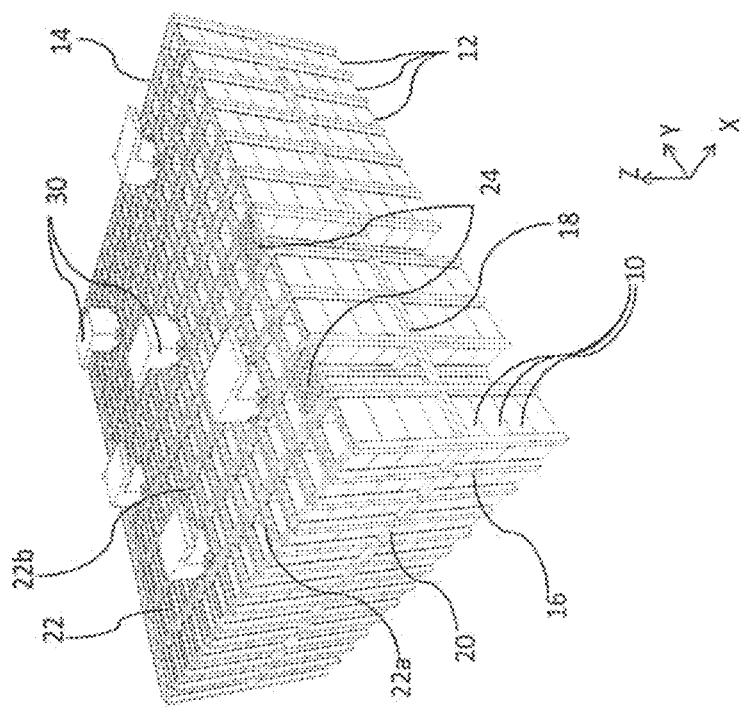
FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22*a*. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12. In addition, a robotic service device is positioned on the grid 14.

It will be appreciated that any form of load handling 30 device may be in use and that the robotic service device may be suitably adapted to interact with any such load handling device 30.

A first form of a second type of robotic service device, will now be described with reference to FIGS. 5 to 7.

Figure 5:
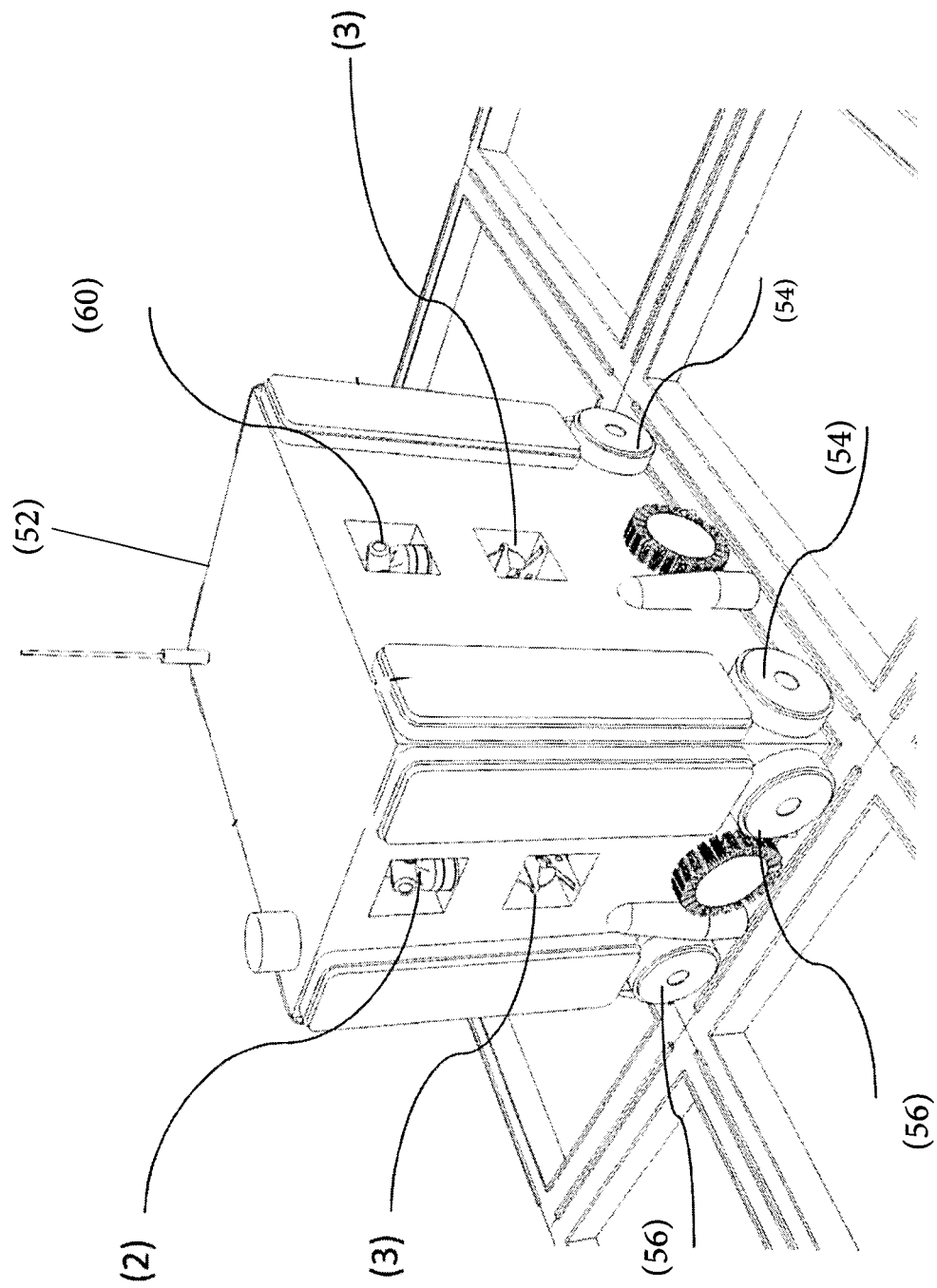
FIG. 5 is a schematic perspective view of a robotic service device according to one embodiment of the present invention.
Figure 6:
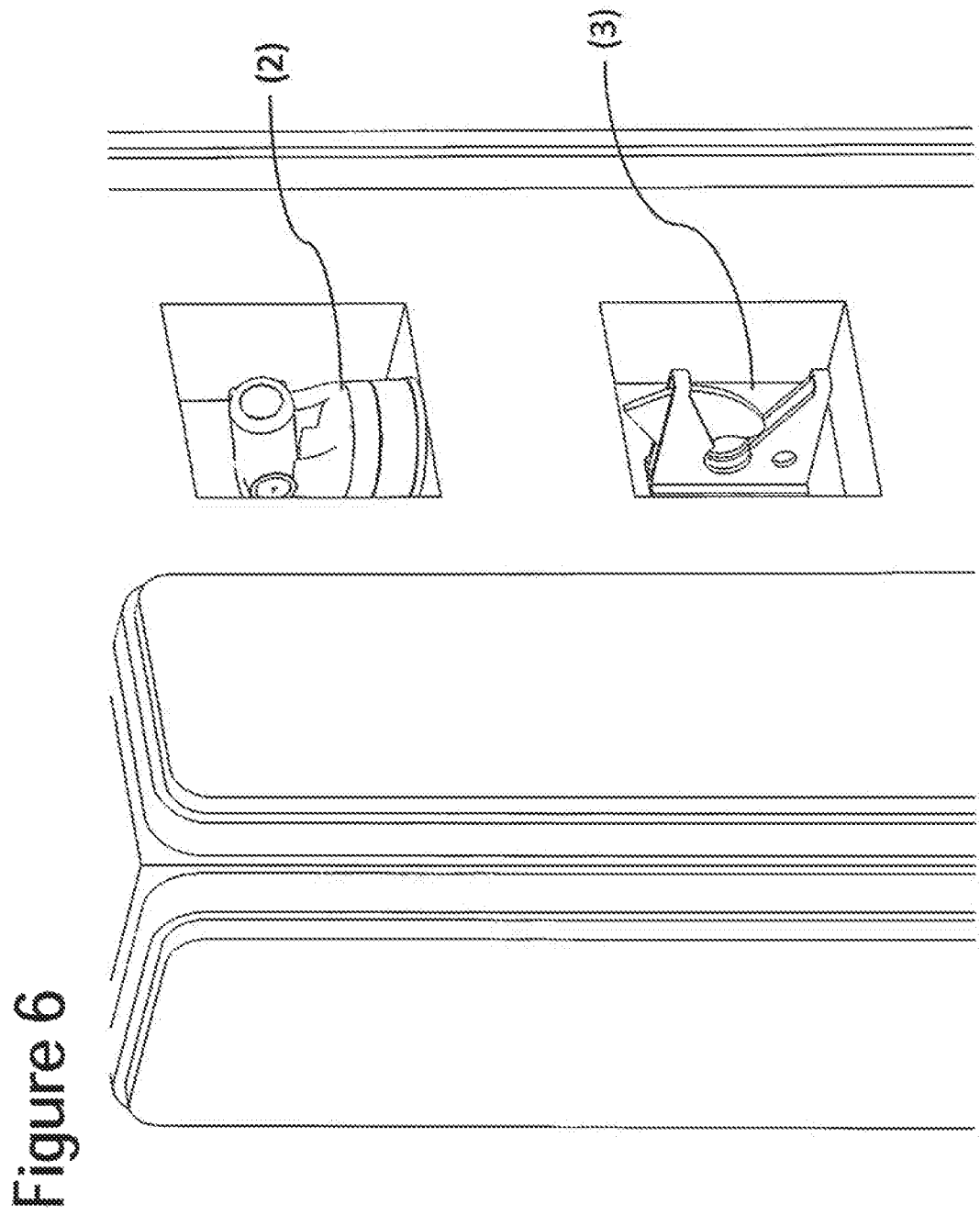
FIG. 6 is a schematic perspective view of part of the service device of FIG. 5, showing a latch mechanism and camera means positioned on the said robotic service device.

Referring to FIG. 5, the robotic service device comprises a vehicle 52 having first and second sets of wheels 54, 56 that are engageable with the first and second sets 22*a*, 22*b* of rails 22, respectively.

The robotic service device is provided with features additional to those of the robotic load handling device 30. As can be seen in FIGS. 5 and 6, the device is provided with a releasable latching mechanism 3 and camera means 2. Furthermore, the device is provided with cleaning means such as brush mechanisms 6 and a vacuum cleaning system 7 mounted adjacent each set of wheels 1. Moreover, the device includes a spray device 5 capable of discharging suitable detergent under the control of the central picking system (not shown).

In a similar manner to the operation of the load handling device 30, the first and second sets of wheels 1 of the robotic service device can be moved vertically with respect to the vehicle to engage or disengage the wheels 1 from the corresponding set of rails 22*a*, 22*b*. By engaging and driving the appropriate set of wheels 1, the robotic service device can be moved in the X and Y directions in the horizontal plane on the top of the frame structure 14.

Figure 8:
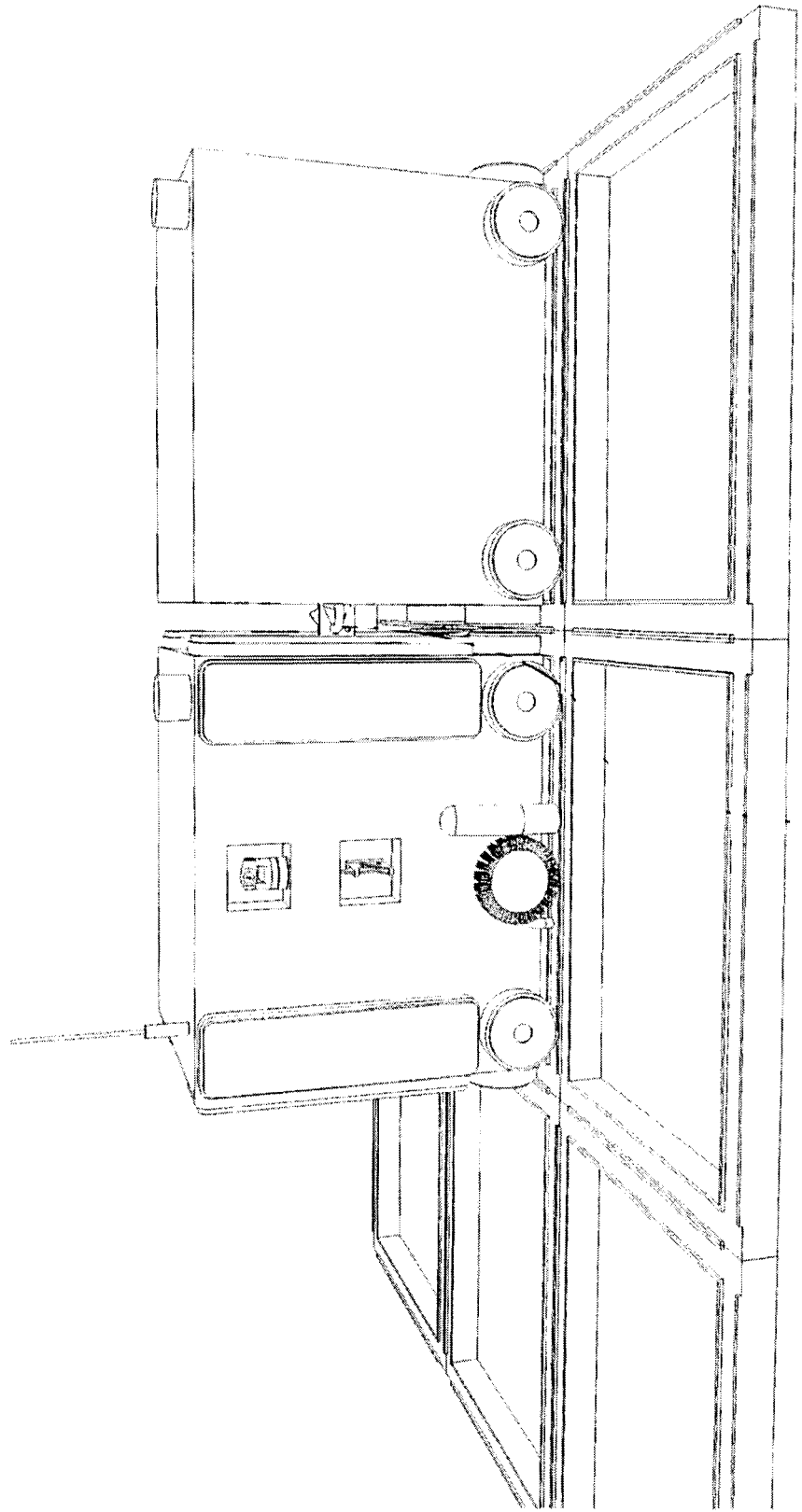
FIG. 8 is a schematic perspective view of the robotic service device of FIGS. 5 to 7, in use, collecting a malfunctioning load handling device.
Figure 9:
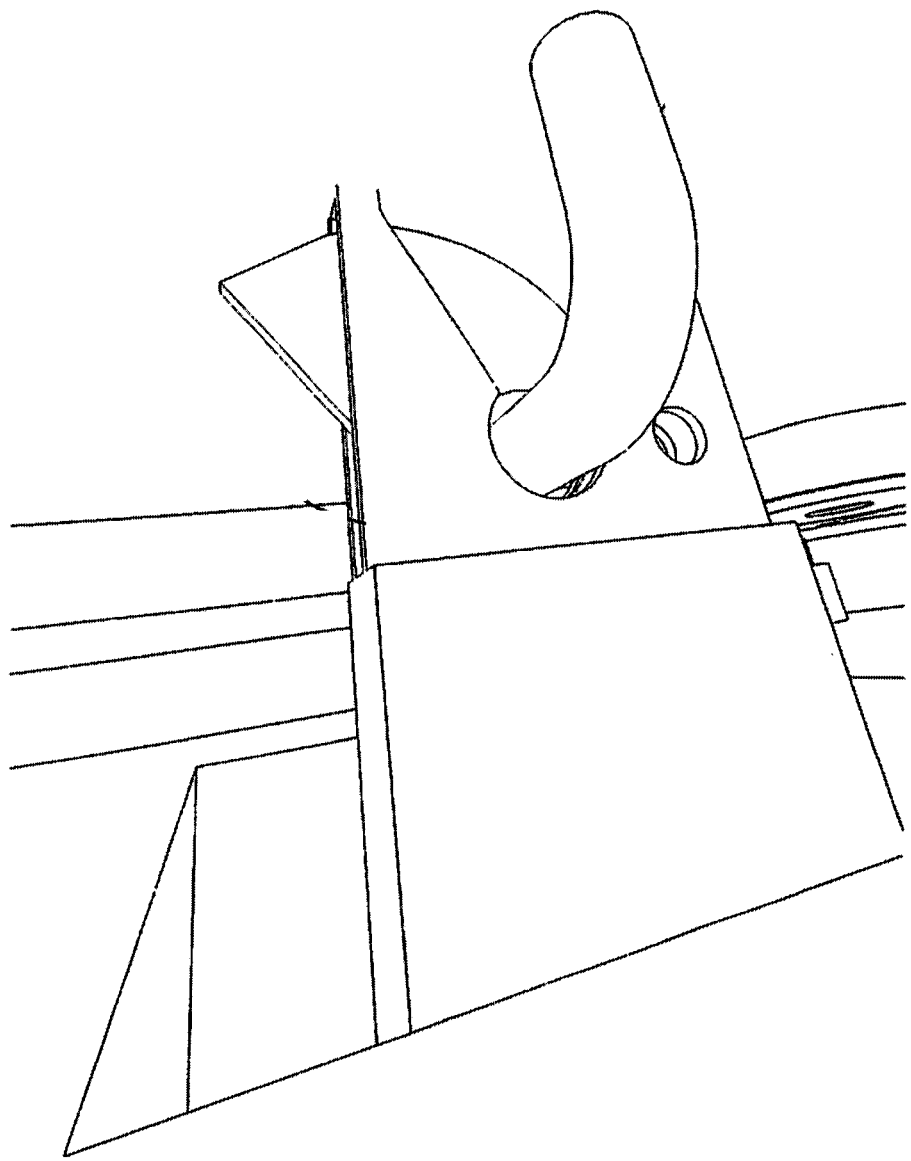
FIG. 9 is an enlarged view of a latching mechanism suitable for latching the malfunctioning load handling device to the robotic service device.

In the event of a failure or malfunction of a robotic load handling device 30, the robotic service device is moved on the grid 14 to a location adjacent the malfunctioning device 30. Once adjacent to the malfunctioning device 30, the camera means 2 of the service device may be used to view the situation from a control position (not shown). If the load handling device 30 requires removal from the grid 14, then the service device may be releasably latched to the malfunctioning load handling device 30 as shown in FIG. 8. The service device may then be used to manipulate the malfunctioning device 30 to a location where it can be serviced or removed entirely from the grid 14.

It will be appreciated that the form of the releasable latching mechanism 3 need not be as shown in FIGS. 5 to 9 but that any suitable form of releasable latching mechanism may be used. The latching mechanism 3 may connect to a faulty robotic load handler and either lift it clear off the grid, or be able to raise and lower the sets of wheels on the faulty device, so as to be able to push, pull or drag it to a desired location. The latching mechanism 3 may also include a device for causing the faulty unit's gripper mechanism to be retracted from the grid or make any other mechanical or electrical intervention with the robotic load handler 30.

Furthermore, it will be appreciated that the service device may be provided with sensor means instead of or in addition to camera means 2. For example, the service device may be provided with sensors that allow a system operator to remotely diagnose a fault with a faulty or stationary robotic load handler 30. This may include, but not be limited to, electrical connection means to connect to a port of the robotic load handler 30 to check for or diagnose faults via an installed diagnostic system. This may further include sensors such as ultrasonic detectors, x-ray cameras, or sensors for assessing the telecommunications functions within the load handling device 30.

Moreover, the service device may comprise reset means, in addition to or instead of the sensors discussed above, to enable the service device to reset the robotic load handling device 30. The reset means may comprise mechanical means such as a remotely operated manipulator device or it may comprise remotely operable electrical reset means. The mechanical manipulator may further be remotely operable to push the load handling device 30 should the diagnosis suggest the load handling device 30 is simply temporarily stuck on a portion of the grid. Alternatively, the mechanical device may act in conjunction with the service device to push the load handling device to an alternative portion of the grid or off the grid completely.

In another use of the robotic service device, the device is used to travel over the grid 14 to establish the condition of the grid 14. For example, over time spillages and dirt may build up on the grid 14. The service device may be provided with a traction measurement system whereby, for example, one or more wheels 1 are driven whilst one or more wheels 1 are braked, in order to establish if there is a spillage and hence loss of traction for the robotic load handlers 30 on the grid 14. The service device may then be deployed on the grid 14 and the camera means 2 used to remotely view the condition of the grid 14. The brush mechanisms 6, the spray detergent 5 and the vacuum system 7 may then be used as appropriate to clean the grid 14.

Spillage of products such as oil onto the grid, which makes the grid slippery, may be detected by ordinary robotic load handlers using slip detection on the wheels. It is then important to deal with the issue immediately to prevent oil to be spread over large portions of the grid. The proposed method would use several aspects of the robotic service to deal with the issue. In use, any robotic device experiencing slippage would be stopped. Other robotic devices within a predetermined radius of the potential spillage would also be stopped. The picking control system may be used to block all potentially affected areas of the grid in software such that no other robotic devices 30 may access the affected area. One or more robotic service devices may then be deployed initially to clean the area around the now stationary robotic devices. The drive mechanism of the deployed service device may then be used to measure traction, to ensure any spillage is properly removed. The robotic service device may then be used to pick up and remove the affected robotic load handling device 30 to a maintenance area, such that the wheels may be cleaned. Further robotic service devices may be deployed to finish cleaning the affected area until there is sufficient traction on all parts of the grid.

Furthermore, the robotic service device may be provided with means for assessing the mechanical condition of the tracks and the grid. For example, the service device may use sensor or camera means 2 described above to assess the condition of the grid in addition to or separably from assessing the condition of robotic load handling devices 30. For example, the robotic service device may be deployed on to the grid during a housekeeping phase to ensure the stability and integrity of the tracks and grid.

Figure 10:
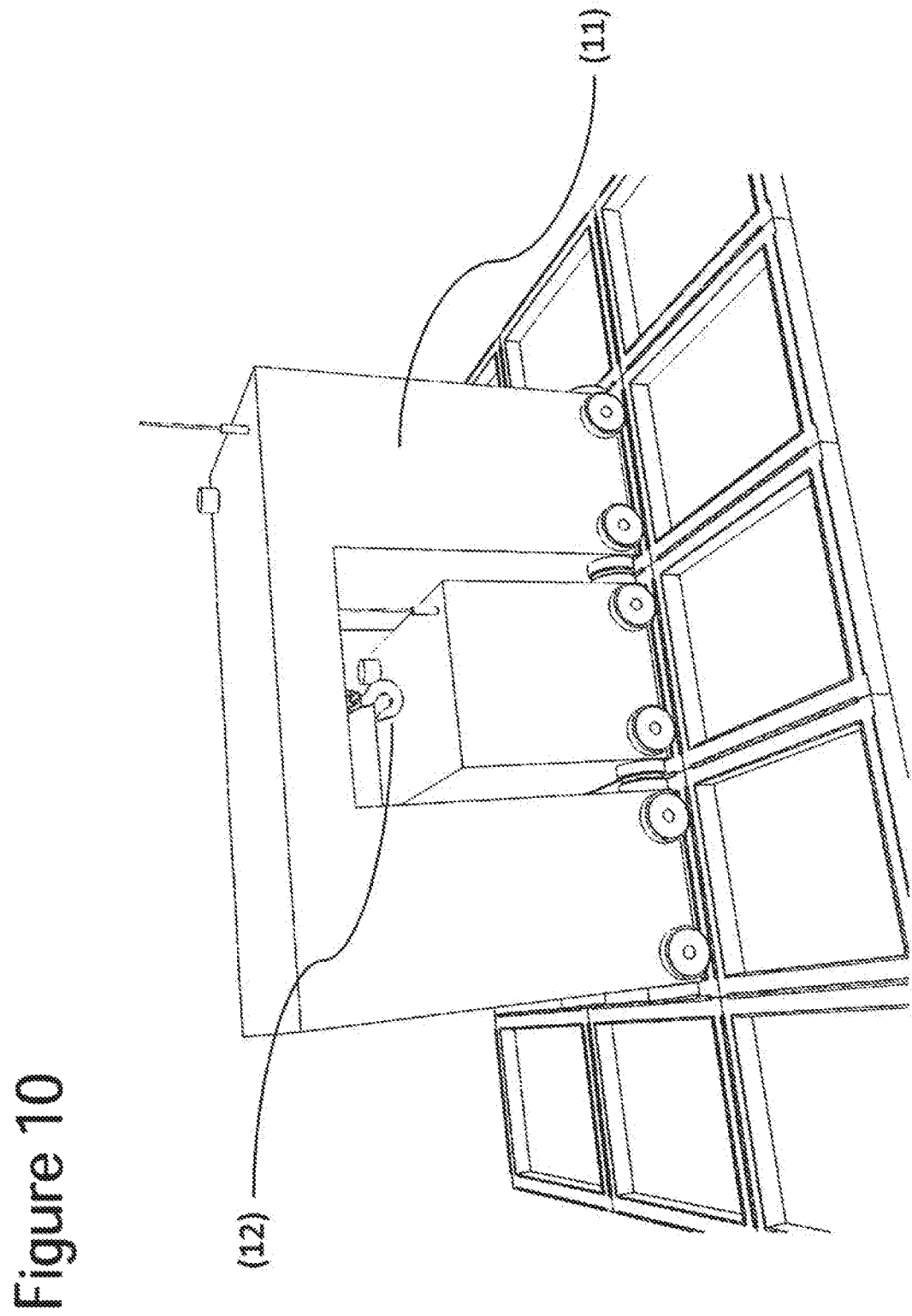
FIG. 10 is a schematic perspective view of a robotic service device according to a second embodiment of the invention, the service device being substantially bridge-shaped.
Figure 11:
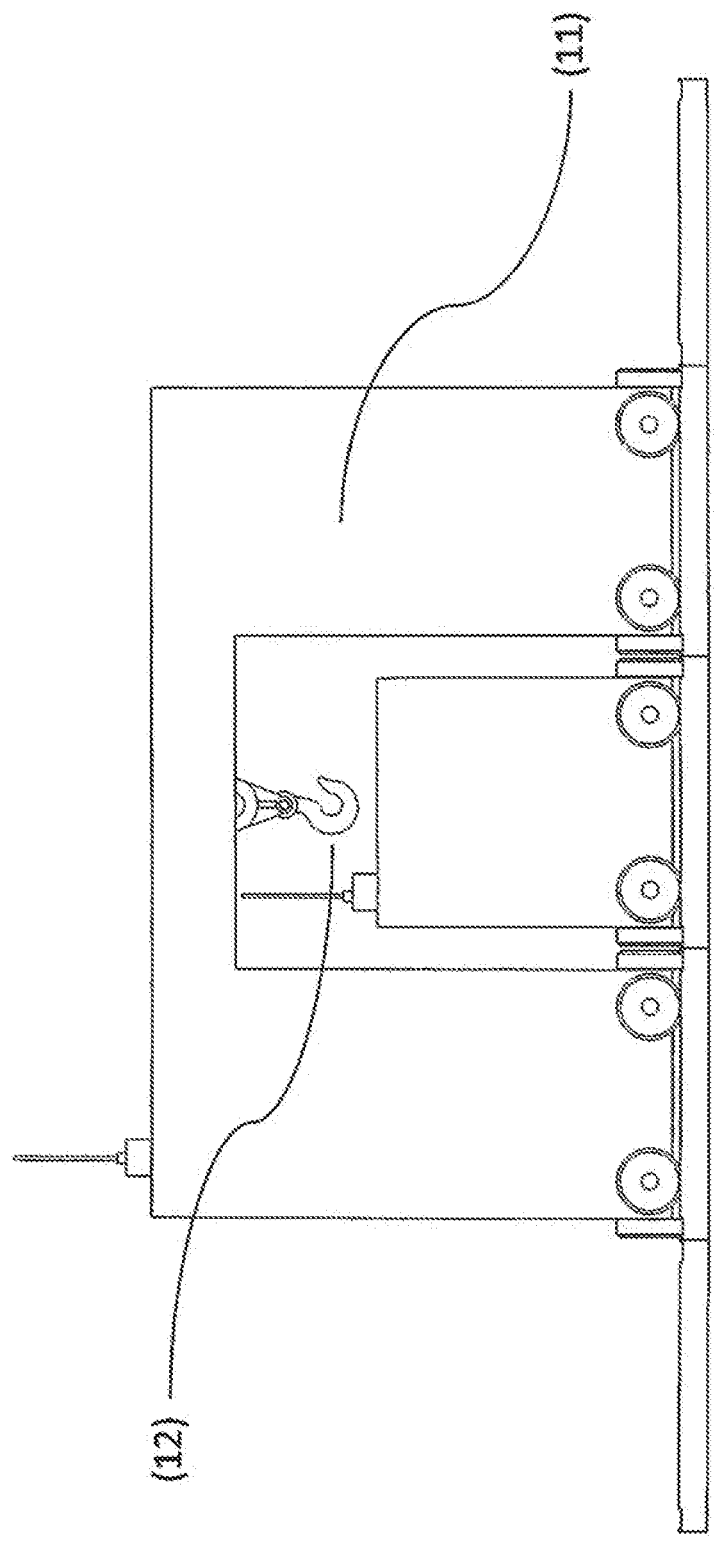
FIG. 11 is a schematic side view of the robotic service device of FIG. 10 in accordance with a second embodiment of the invention, showing the service device in situ over a malfunctioning load handling device.

It will be appreciated that the service device may comprise all, one or any combination of the features described above and that it is not essential to the invention for the service device to include all the sensors and features described. FIGS. 10 and 11 show a second embodiment of the invention. Features similar to that described with reference to the first embodiment will be referenced with the same reference numbers.

FIG. 10 shows an alternative form of robotic service device. The robotic service device comprises a substantially bridge shaped vehicle 11. Referring to FIGS. 10 and 11, the robotic service device comprises a vehicle 11 having first and second sets of wheels that are engageable with the first and second sets 22a, 22b of rails 22, respectively. The bridge-shaped vehicle 11 is sized so as to be capable of straddling a load handling device 30. The service device is provided with a releasable latching or hook mechanism 12 deployable from the underside of the bridge portion.

In use, the first and second sets of wheels 1 of the robotic service device can be moved vertically with respect to the vehicle 11 to engage or disengage the wheels 1 from the corresponding set of rails 22a, 22b. By engaging and driving the appropriate set of wheels 1, the robotic service device can be moved in the X and Y directions in the horizontal plane on the top of the frame structure 14.

In this manner, the service device may be deployed on the grid 14 and driven to a point whereby it straddles a malfunctioning load handling device 30 such that the latching or hook mechanism 12 may be used to lift the malfunctioning device 30 from the grid 14. The picking control system may then be used to move the service device to a position on the grid 14 where the malfunctioning load handling device 30 may be removed as necessary. It will be appreciated that, although not shown in the drawings, the service device of the second embodiment may also have the features described with reference to the first embodiment, including but not limited to brush mechanisms 6, vacuum systems 7, spray systems 5, traction measurement systems and camera means 60, all operational in a similar manner to that described above.

Figure 12:
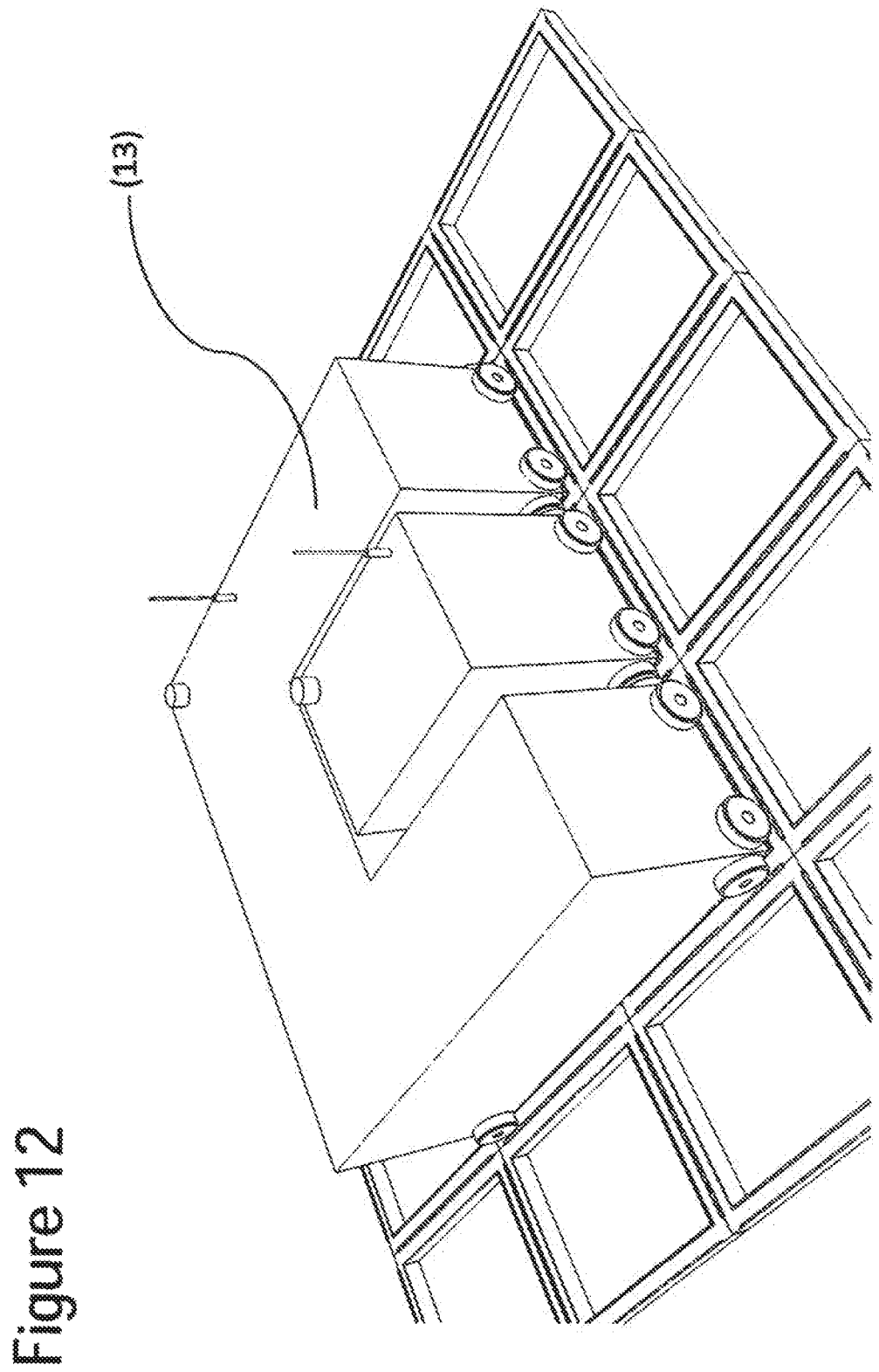
FIG. 12 is a schematic perspective view of a robotic service device according to a third embodiment of the invention, the service device being substantially u-shaped.

FIG. 12 shows a third embodiment of the invention. Features similar to that described with reference to the first and second embodiments of the invention will be referenced with the same reference numbers.

Referring to FIG. 12, the robotic service device comprises a vehicle 13 having first and second sets of wheels 1 that are engageable with the first and second sets 22a, 22b of rails 22, of the grid 14 respectively. The u-shaped vehicle 13 is sized so as to be capable of enclosing a load handling device 30. The service device is provided with a releasable latching or hook mechanism deployable from within the u-shaped portion 13.

In use, the first and second sets of wheels 1 of the robotic service device can be moved vertically with respect to the vehicle 13 to engage or disengage the wheels 1 from the corresponding set of rails 22a, 22b. By engaging and driving the appropriate set of wheels 1, the robotic service device can be moved in the X and Y directions in the horizontal plane on the top of the grid 14.

In this manner, the service device may be deployed on the grid 14 and driven to a point whereby it encloses a malfunctioning load handling device 30 such that the latching or hook mechanism may be used to pull, push or otherwise manipulate the malfunctioning device 30. The picking control system may then be used to move the service device to a position on the grid 14 where the malfunctioning load handling device 30 may be removed as necessary. It will be appreciated that, although not shown in the drawings, the service device of the third embodiment may also have the features described with reference to the first and second embodiments, including but not limited to brush mechanisms 6, vacuum systems 7, spray systems 5, traction measurement systems and camera means 60, all operational in a similar manner to that described above.

It will be appreciated that the latching device need not take the form of a hook but that any suitable latching means may be used. For example the latching means may be magnetic or electro-magnetic. Furthermore, the latching means may be positioned at any point on the service device, indeed a plurality of latching mechanisms may be employed on all sides of the service device such that a load handling device may be approached and latched from any direction on the grid.

Moreover, the latching mechanism of the service device may interact with the load handling device in any way suitable to remove the load handling device from the grid. There may be electronic communication or mechanical interaction between the service device and the load handling device of any form in order to release the load handling device from the grid.

Figure 13:
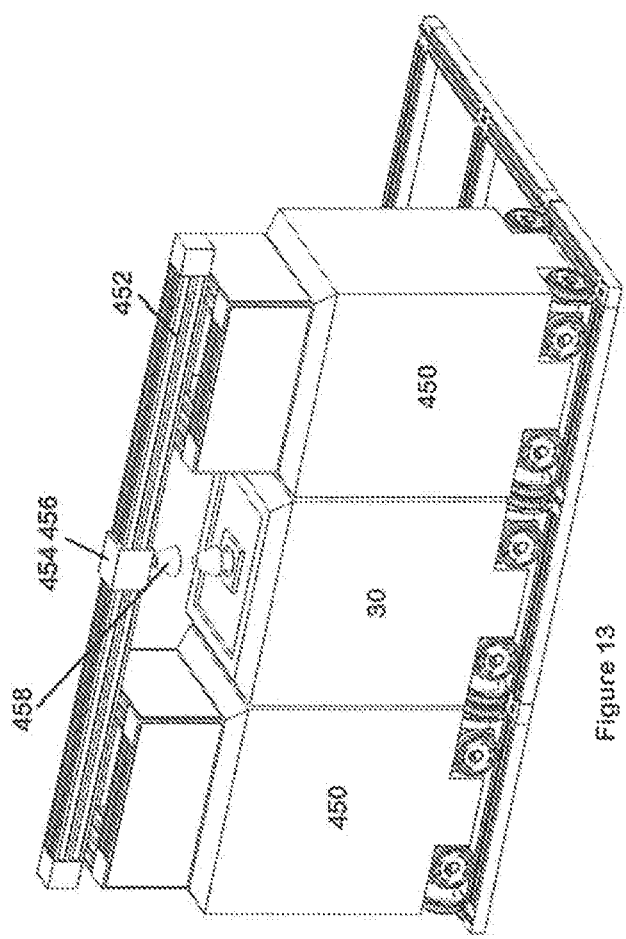
FIG. 13 is a schematic perspective view of a robotic service device according to a fourth embodiment of the invention, a plurality of service devices operating so as to engage a malfunctioning service device to move it or remove it from the grid.
Figure 14:
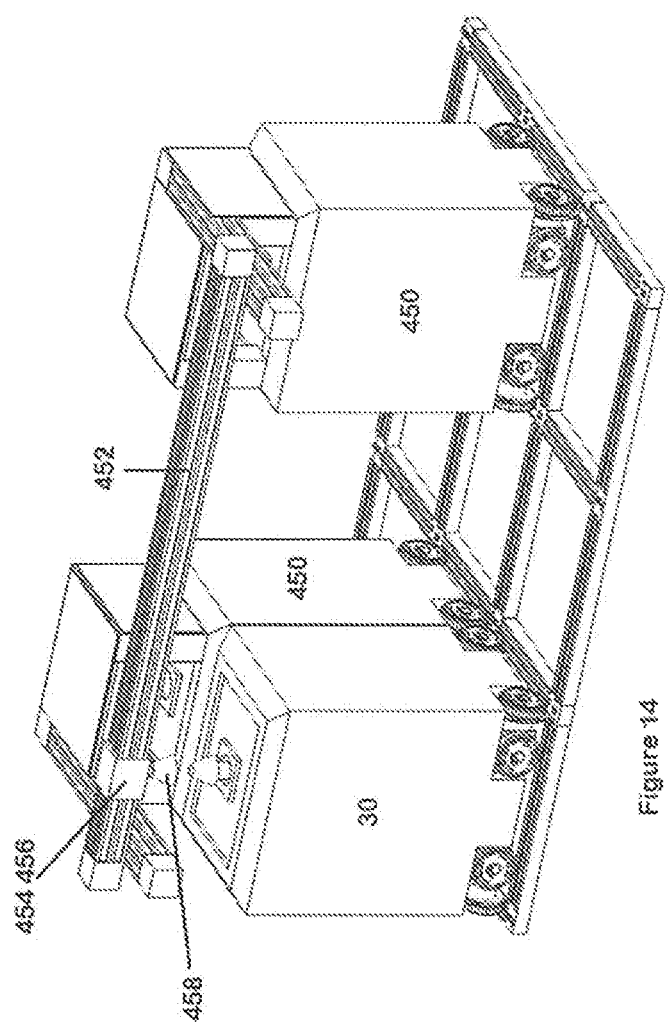
FIG. 14 is a schematic perspective drawing of a robotic service device in accordance with the fourth embodiment of the invention, showing a different configuration of the plurality of service devices.
Figure 15:
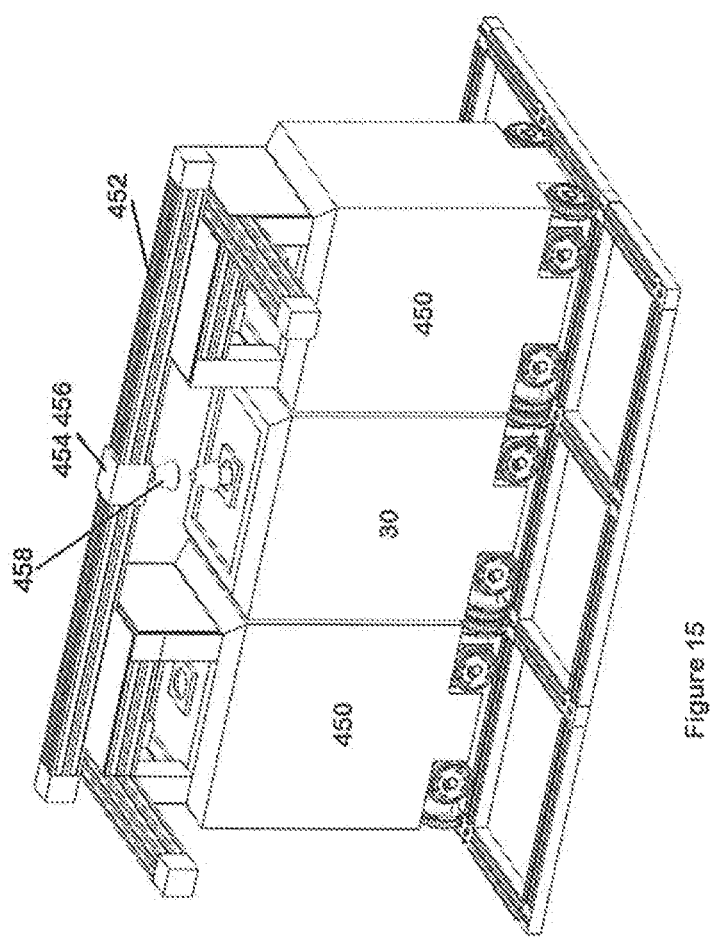
FIG. 15 is a schematic perspective drawing of a robotic service device in accordance with the fourth embodiment of the invention, showing a further configuration of the plurality of service devices.

FIGS. 13 to 15 show a further embodiment of the robotic service device. Features similar to that described with reference to previous embodiments of the invention will be referenced with the same numerals.

In FIG. 13, a pair of robotic service devices 450 are shown connected by a suitable member 452. The member 452 allows the separate robotic service devices 450 to act as a single unit. The member 452 is further provided with connecting, latching and lifting means 454, 456.

The connected robotic service devices 450 are remotely manoeuvred into position such that they occupy grid spaces adjacent an inoperable load handling device 30. From this position the latching means 454 can be lowered or adjusted to connect with a co-operating latching point 456 on the robotic load handling device 30. Once connected, the lifting means 456 is operated to lift the inoperable load handling device 30 clear of the grid and tracks. Once lifted clear, the connected robotic service devices 450 can be remotely instructed to move to a position off the grid to enable recovery of the robotic load handling device.

FIGS. 14 and 15 show alternative configurations for the connected robotic service devices 450 and alternative positions of the member 452 and the connecting latching and lifting means 454, 456.

It will be appreciated that in this embodiment of the invention, it is possible to approach and lift robotic load handling devices from any part of the grid, including the very corners or edges or adjacent supporting structures as the robotic service device 450 connects to the load handling device 30 at a top mounted coupling.

It will be appreciated that the configurations shown in FIGS. 13 to 15 are just a selection of a number of possible configurations and that the invention of the fourth embodiment is not limited to simply these configurations. The connecting, latching and lifting mechanism may be a single mechanism or three separate mechanisms. The connecting and latching mechanisms may comprise mechanical, magnetic or electro-magnetic means or any other suitable means. The lifting means may comprise winch means 458 or any other suitable lifting means.

Figure 16:
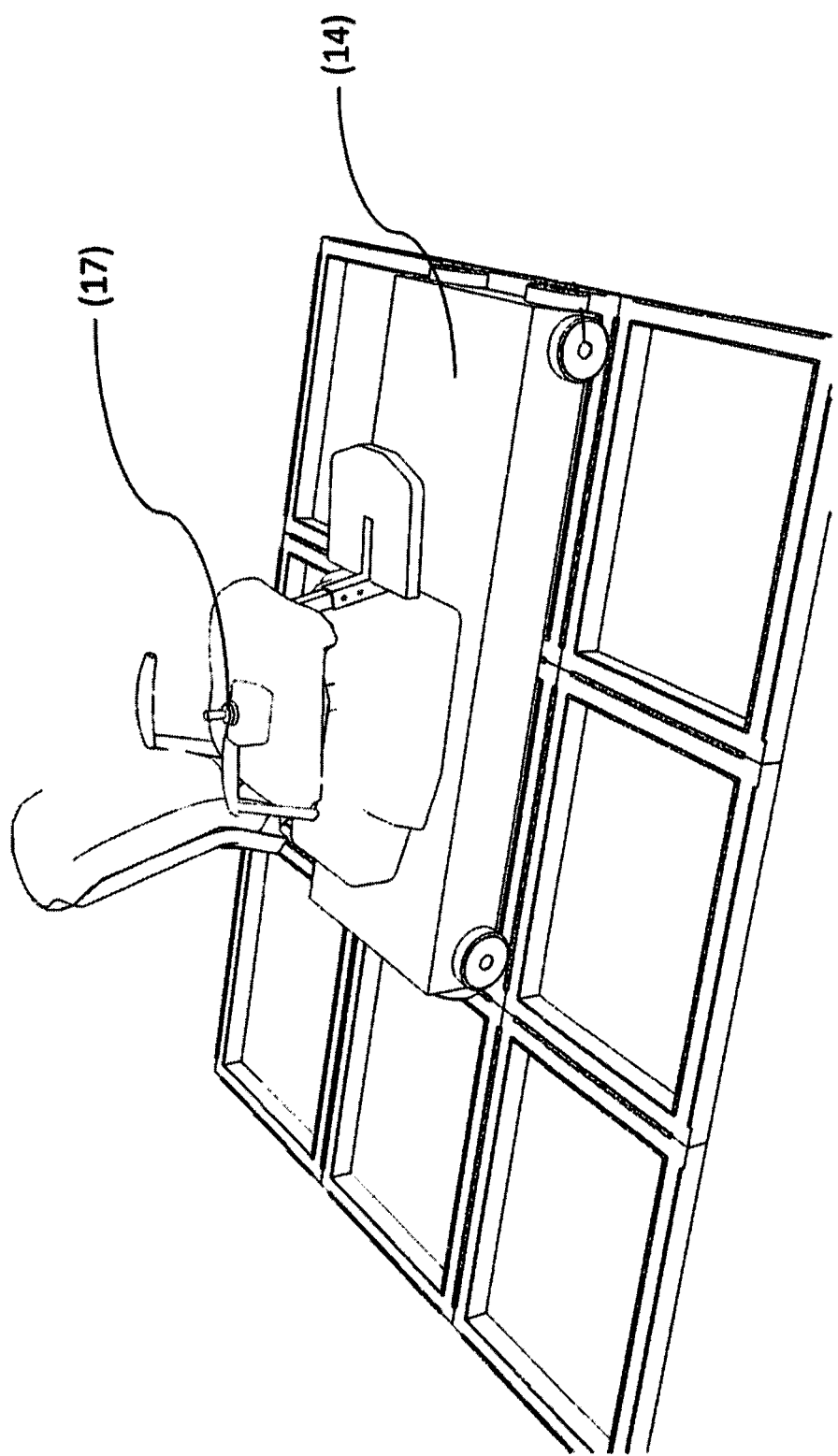
FIG. 16 is a schematic perspective view of a robotic service device according to a fifth embodiment of the invention, in which the service device is provided with a seat to enable carriage of a passenger or user.

FIG. 16 shows a fifth embodiment of the invention. Features similar to that described with reference to the first, second and third embodiments of the invention will be referenced with the same reference numbers.

Referring to FIG. 16, the service device comprises a substantially planar vehicle having first and second sets of wheels 1 that are engageable with the first and second sets 22a, 22b of rails 22, of the grid 14 respectively. The planar vehicle is provided with seating means 17 so as to be capable of carrying a user. The service device may be robotically controlled by the picking system control but may also be manually driven by the user (not shown).

In use, the first and second sets of wheels 1 of the service device can be moved vertically with respect to the vehicle to engage or disengage the wheels 1 from the corresponding set of rails 22a, 22b. By engaging and driving the appropriate set of wheels 1, the service device can be moved in the X and Y directions in the horizontal plane on the top of the grid 14.

In this manner, the service device may be deployed on the grid 14 and driven to a predetermined point on the grid where inspection or maintenance is required.

It will be appreciated that, although not shown in the drawings, the service device of the fifth embodiment may also have the features described with reference to the first, second third and fourth embodiments, including but not limited to brush mechanisms 6, vacuum systems 7, spray systems 5, traction measurement systems and camera means 60, all operational in a similar manner to that described above.

In this manner, the integrity of a large robotically controlled picking system can be maintained and cleaned without the requirement of stopping the whole system to retrieve malfunctioning load handling devices or to clean spillages on the grid. In systems of significant size this can represent a substantial decrease in the down time of the system.

Furthermore, it is possible for the robotic service device described in all or any of the embodiments above to be adapted to carry equipment such as barriers (not shown). The remotely operable mechanical manipulating means may position barriers around a portion of the grid for example, for safety reasons should an operator need to be present on the grid.

It will be appreciated that robotic service devices as described above may contain one or all of the features described. For example, a service device may be capable of lifting a malfunctioning load handling device off the grid and removing it to a maintenance location on the grid, whilst also comprising traction monitoring means and cleaning devices. Furthermore, a ride-on service device may also be provided with the means to pull a malfunctioning load handling device off the grid.

Furthermore, the robotic service device may comprise a load carrying portion, similar to the load handling device, the load carrying portion being adapted to carry maintenance and cleaning equipment such as that described above. Moreover, the load carrying portion may be interchangeable such that one service device may be able to perform different functions depending on the load carrying portion provided at any one time.

It will also be appreciated that the robotic load handling devices 30 may be of the cantilever form shown in FIGS. 1 to 4, that occupy two grid spacings or alternatively the robotic load handling devices 30 may be of the form shown in FIGS. 13 to 15 where they occupy only a single grid spacing.

Many variations and modifications not explicitly described above are also possible without departing from the scope of the invention as defined in the appended claims.

The invention claimed is:

1. A service device for operation on a robotic picking system, the service device comprising:
    a body mounted on a first and a second set of wheels, the first set of wheels being configured and arranged to engage with at least two rails of a first set of rails, the second set of wheels being configured and arranged to engage with at least two rails of a second set of rails such that the first and the second sets of rails form a grid, the first set of wheels being independently moveable and drivable with respect to the second set of wheels such that only one set of wheels will engage with the grid at any one time thereby enabling movement of the service device to a point on the grid by driving only the engaged set of wheels at a given time;
    a releasable latching mechanism, the latching mechanism being operable to releasably connect the service device to a malfunctioning load handling device when present on the grid, the latching mechanism being operable to isolate the malfunctioning load handling device from the grid with the service device being configurable to assume control of the malfunctioning load handling device and move the malfunctioning load handling device to a predetermined position on the grid, wherein the malfunctioning load handling device is operable on the grid, and the malfunctioning load handling device and the service device are remotely maneuverable; and
    a traction measurement system having drive means for driving the first set of wheels when engaged with the grid whilst stopping engagement of the second set of wheels with the grid, said drive means being controlled by an electronic control means.

2. A service device according to claim 1, in which the latching mechanism comprises means for lifting the malfunctioning load handling device clear of the first and the second sets of rails and removing said load handling device to a predetermined position on the grid.

3. A service device according to claim 1, in which the malfunctioning load handling device comprises:
    a first set of wheels and a second set of wheels for engaging with the first set of rails and the second set of rails respectively of the grid; and
    in which the latching mechanism comprises:
    means for releasably docking the service device to the malfunctioning load handling device, wherein the service device is configured to release both the first set of wheels and the second set of wheels of the malfunctioning load handling device from the first and the second sets of rails of the picking system when in operation such that the service device can push or pull the malfunctioning load handling device to a predetermined position on the grid.

4. A service device according to claim 1 in which the electronic control means is configured to monitor rotation of both sets of wheels such that traction of the wheels on the grid is to be measured and compared with a predetermined traction data in order to establish when grid cleaning is desired.

5. A service device according to claim 1 comprising:
    a cleaning mechanism.

6. A service device according to claim 5 in which the cleaning mechanism comprises:
a vacuum cleaner and/or several brushes and/or a spray device configured to remove spillages on the grid when the cleaning mechanism is in operation.

7. A service device according to claim 1 comprising:
camera means for providing a vision system to observe a condition of the malfunctioning load handling device or the grid remotely.

8. A service device according to claim 1, comprising:
seating means for a user such that the service device may be used in instances when manual intervention may be necessary on the grid.

9. A service device according to claim 1 comprising:
seating means to enable a user to travel on to the grid to perform maintenance or observation functions.

10. A service device according to claim 1, in combination with a robotic picking system comprising:
two substantially perpendicular sets of rails forming a grid; and
at least one robotic load handling device configured for movement on the grid, the service device being configured to isolate and/or assume control of the at least one robotic load handling device.

11. A service device for operation on a robotic picking system, the service device comprising:
a body mounted on a first and a second set of wheels, the first set of wheels being configured and arranged to engage with at least two rails of a first set of rails, the second set of wheels being configured and arranged to engage with at least two rails of a second set of rails such that the first and the second sets of rails form a grid, the first set of wheels being independently moveable and drivable with respect to the second set of wheels such that only one set of wheels will engage with the grid at any one time thereby enabling movement of the service device to a point on the grid by driving only the engaged set of wheels at a given time;
a cleaning mechanism having means configured for removing contaminants present on the grid system, wherein a malfunctioning load handling device is operable on the grid, and the malfunctioning load handling device and the service device are remotely maneuverable; and
a traction measurement system having drive means for driving the first set of wheels when engaged with the grid whilst stopping engagement of the second set of wheels with the grid, said drive means being controlled by an electronic control means.

12. A service device according to claim 11, wherein the cleaning mechanism comprises:
a vacuum cleaner and/or several brushes and/or a spray device configured to remove contaminants on the grid.

13. A service device according to claim 12, comprising:
camera means for providing a vision system such that a user may observe a condition of the malfunctioning load handling device or the grid remotely.

14. A service device according to claim 13 comprising:
a releasable latching mechanism, the latching mechanism being operable to releasably dock the service device to the malfunctioning load handling device when present on the grid, the latching mechanism additionally being operable to isolate the malfunctioning load handling device from the grid with the service device being configurable to assume control of the malfunctioning load handling device and move the malfunctioning load handling device to a predetermined position on the grid.

15. A service device according to claim 14 in which the latching mechanism comprises:
means for lifting the malfunctioning load handling device clear of the first and the second sets of rails of a grid and removing said malfunctioning load handling device to a predetermined position on the grid when the means for lifting the malfunctioning load handling device is in operation.

16. A service device according to claim 14, in which the malfunctioning load handling device comprises:
a first set of wheels and a second set of wheels for engaging with the first set of rails and the second set of rails respectively of the grid; and
in which the latching mechanism comprises:
means for releasably docking the service device to the malfunctioning load handling device, wherein the service device is configured to release both the first set of wheels and the second set of wheels of the malfunctioning load handling device from the first and the second sets of rails of the picking system such that the service device can push or pull the malfunctioning load handling device to a predetermined position on the grid.

17. A service device according to claim 16 in which the electronic control means is configured to monitor rotation of at least one of the first set of wheels and the second set of wheels of the service device such that traction of the wheels on the grid is to be measured and compared with a predetermined traction data in order to establish when grid cleaning is desired.

18. A service device according to claim 17, in combination with a robotic picking system comprising:
two substantially perpendicular sets of rails forming a grid; and
at least one robotic load handling device configured for movement on the grid, the service device being configured to isolate and/or assume control of the at least one robotic load handling device.

* * * * *